Patented Feb. 19, 1929.

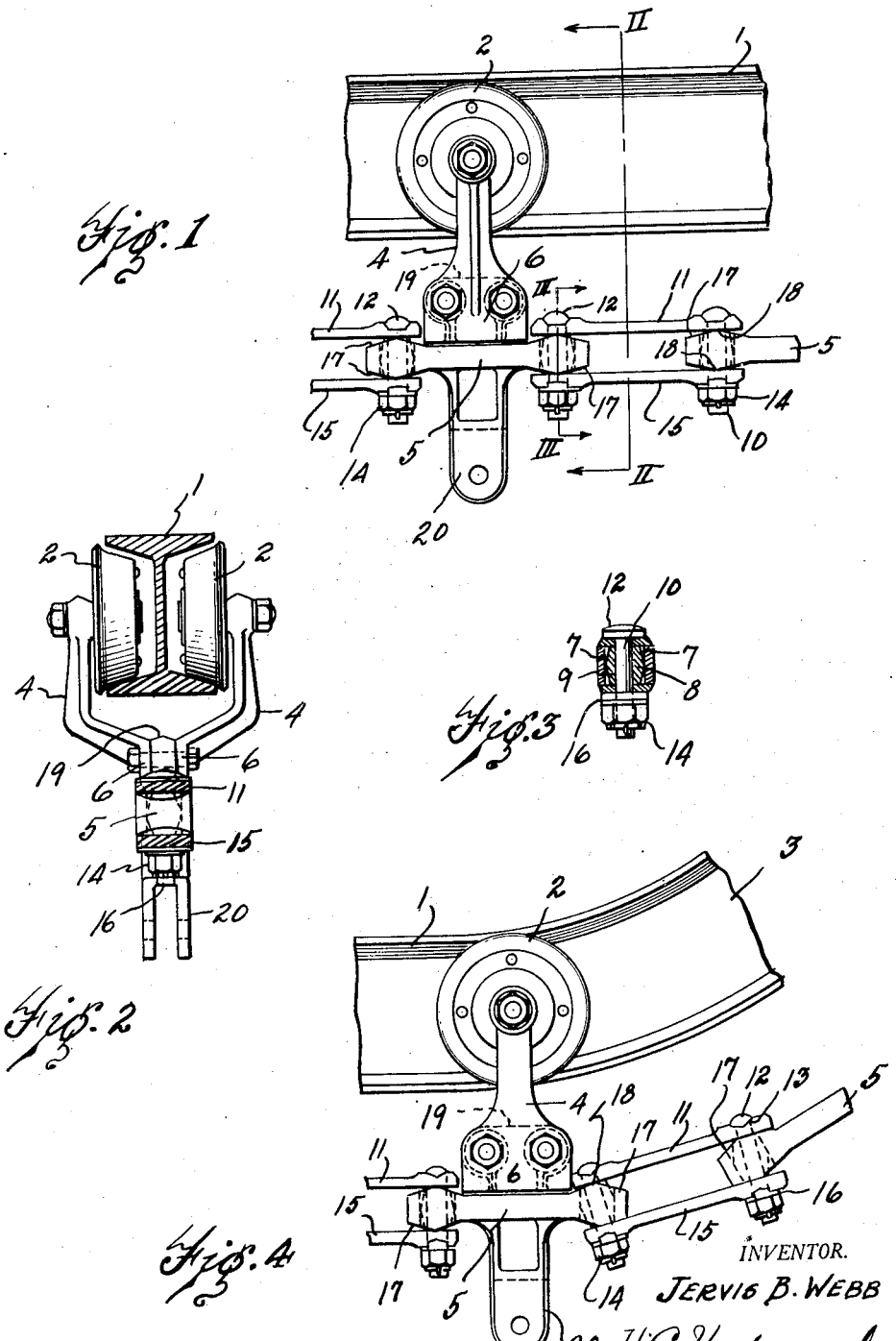

1,702,803

UNITED STATES PATENT OFFICE.

JERVIS B. WEBB, OF DETROIT, MICHIGAN.

CHAIN FOR CONVEYERS.

Application filed September 4, 1926. Serial No. 133,522.

In my Patent No. 1,541,539, dated June 9th, 1925, there is disclosed a trolley for chain conveyers which possesses many novel features in connection with the trolley harp and chain members, and now I aim to improve the chain so as to provide a better construction and mode of operation for the chain.

First, may be mentioned a universal connection between the component parts of the chain so that it may flex in vertical and horizontal planes to accommodate itself to curved sections of trolley rails or supports. Such curved rail sections are used for elevating work from loading positions to overhead positions and back again to an unloading position, also for carrying work around corners, into and out of ovens and other structures. The flexure of the chain parts is attained by a rocking and pivotal action of link ends relative to adjacent connecting members, and the articulation is such as to insure a semi-rigid condition that provides strength, durability, proper spacing, and maximum carrying capacity.

Next, the link connecting members of the chain are of novel design and may be made to serve simply as connectors or as suspension or carrier members, for attachment to or as an integral part of a trolley harp or hanger. Such members simplify the construction of a chain and consequently reduce the expense of manufacture, and provide an improved function in such chain operation.

Other advantages of my construction will hereinafter appear and reference will now be had to the drawing wherein:

Fig. 1, is a side elevation of a portion of a trolley conveyer.

Fig. 2, is a cross-sectional view taken on line II—II of Fig. 1.

Fig. 3, is a similar view of the chain taken on line III—III of Fig. 1.

Fig. 4, is a view similar to Fig. 1 showing a curved trolley rail and flexure of the chain.

In the drawing, the reference numeral 1 denotes a conventional form of trolley rail or overhead support upon which one or more trolley wheels 2 may travel, and in practice, this rail may have curved portions 3. The trolley wheels 2 are carried by a harp 4 having connecting portions 6 and these portions may be integral with a chain member or carrier 5 or may be suitably connected thereto, as shown.

The chain member 5 has its ends provided with openings or sockets 7 and loosely mounted in said openings are ball members 8 having openings 9 for pivot pins or bolts 10. These bolts are employed for holding rockable chain links 11 and 15 disposed in parallelism and connected to other suspension members composing the chain.

In order that the bolts may hold the rockable links, said bolts are formed with cross heads 12 engaging in seats 13 provided therefor in the ends of the links 11, said heads being on the upper ends of said bolts, while the lower ends of said bolts are equipped with locked nuts or retainers 14 having washers 16 engaging in the link 15.

In order that the links or members of the chain may have a rocking action, the ends of the members 5 have the upper and lower edges thereof bevelled, as at 17 to form angularly disposed link engaging faces, and these faces co-operate in providing fulcrum points or ridges 18 for the links or articulating members of the chain.

As a result of this constructive arrangement of parts, I have a trolley chain or flexible connector for trolley suspension members which possesses the requisite rigidity for spacing purposes, yet has flexibility to permit the suspenion members 5 to travel on a curved or irregular rail portion. The flexibility is that attained by the links being turnable and rockable. It is by virtue of the bolts 10 turning in the ball members 8 or said ball members rotating in the openings 7 that the links 11 and 15 may swing laterally relative to a suspension member 5 or adjacent chain member, when the harp 4 follows a horizontally curved rail, and it is by virtue of the ball members 8 oscillating in the openings 7 and the links 11 and 15 rocking on the ridges or points 18 that the component parts of the chain may assume an angular relation as the harp 4 follows a vertically curved or irregular portion of the trolley rail.

I attach considerable importance to the flexure of the chain and particularly the semi-rigid condition of the same relative to curved sections of rails or supports. A greater number of carriers may be used to increase the carrying capacity of the conveyer without any danger of the carriers crowding and allowing carried or suspended work to contact. This is desirable in large industrial plants using such conveyers in enamelling and drying ovens. The carriers may be placed closer together on an inclining or declining track, because this form of link connection will not bind, as in former constructions.

Considering the suspension or carrier members, obviously these members may be made in one piece with the harp engaging portion 19 and the depending portion 20 integral with said member, or these vertically aligning portions may be a separate member or members extending through and attached to the carrier members, so that parts are readily replaceable. Furthermore, the ends of each carrier may be bifurcated, instead of apertured, and formed with concave seats or socket portions for the ball members 8.

My prior patent above referred to teaches the use of certain details of construction in connection with the trolley harp or carriage; the use of anti-frictional bearings; a novel form of trolley harp, and while in this application there is shown and described a preferred embodiment of my invention, it is to be understood the elements are susceptible to such changes as are permissible by the appended claims.

I claim:

1. A chain of the type described, comprising carrier members, each member having its ends provided with openings and angular faces, parallel links fulcrumed on the ends of said carrier member and engageable with the faces of said member, and means in the openings of said member maintaining the parallel relation of said links and permitting pivotal movement of said links relative to said carrier member.

2. A chain as called for in claim 1 wherein said means includes ball members in said member openings and link bolts extending axially of said ball members.

Signed at the city of Detroit, county of Wayne, State of Michigan, this 13th day of July, 1926.

JERVIS B. WEBB.